United States Patent
Li et al.

(10) Patent No.: US 11,350,359 B2
(45) Date of Patent: May 31, 2022

(54) DATA TRANSMISSION METHOD, ACCESS POINT, AND STATION

(71) Applicant: Huawei Technologies Co., Ltd., Shenzhen (CN)

(72) Inventors: Yanchun Li, Boulogne Billancourt (FR); Zhou Lan, Shenzhen (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/862,434

(22) Filed: Apr. 29, 2020

(65) Prior Publication Data

US 2020/0260375 A1   Aug. 13, 2020

Related U.S. Application Data

(63) Continuation of application No. 15/870,137, filed on Jan. 12, 2018, now abandoned, which is a
(Continued)

(51) Int. Cl.
*H04W 52/02* (2009.01)
*H04W 72/04* (2009.01)
(Continued)

(52) U.S. Cl.
CPC ... *H04W 52/0206* (2013.01); *H04W 28/0221* (2013.01); *H04W 28/20* (2013.01);
(Continued)

(58) Field of Classification Search
CPC . H04W 52/0206; H04W 72/04; H04W 76/22; H04W 28/0221; H04W 28/20;
(Continued)

(56) References Cited

U.S. PATENT DOCUMENTS

| 7,508,781 B2 | 3/2009 | Liu et al. |
| 8,526,346 B1 | 9/2013 | Liu |

(Continued)

FOREIGN PATENT DOCUMENTS

| CA | 2992630 A1 | 1/2017 |
| CN | 101662401 A | 3/2010 |

(Continued)

OTHER PUBLICATIONS

U.S. Appl. No. 15/870,137, filed Jan. 12, 2018.
(Continued)

*Primary Examiner* — Michael K Phillips
(74) *Attorney, Agent, or Firm* — Leydig, Voit & Mayer, Ltd.

(57) ABSTRACT

This application provides a data transmission method. When performing data transmission with a first station in a bandwidth power saving mode by using an operating channel of the first station, an access point performs data transmission with a second station by using an operating channel of the second station. Therefore, even if the operating channel of the first station includes a primary channel, the access point can still perform data transmission with the second station by using another channel. Further, for the access point, although the operating channel of the first station occupies only a part of available bandwidth resources of the access point, the access point can still perform data transmission with the second station by using a remaining channel.

13 Claims, 6 Drawing Sheets

Related U.S. Application Data continuation of application No. PCT/CN2015/084232, filed on Jul. 16, 2015.

(51) Int. Cl.
*H04W 76/22* (2018.01)
*H04W 28/02* (2009.01)
*H04W 28/20* (2009.01)
*H04W 36/08* (2009.01)
*H04W 24/02* (2009.01)

(52) U.S. Cl.
CPC ............ *H04W 36/08* (2013.01); *H04W 72/04* (2013.01); *H04W 76/22* (2018.02); *H04W 24/02* (2013.01); *Y02D 30/70* (2020.08)

(58) Field of Classification Search
CPC ..... H04W 36/08; H04W 24/02; H04W 84/12; H04W 74/0816; H04W 52/0216; H04W 52/0219; H04W 74/0808; H04W 88/08; H04W 52/0235; H04W 74/002; H04W 74/06; Y02D 30/70
See application file for complete search history.

(56) References Cited

U.S. PATENT DOCUMENTS

| | | | |
|---|---|---|---|
| 8,811,426 B1 | 8/2014 | Banerjea | |
| 8,830,847 B1 | 9/2014 | Doherty et al. | |
| 2008/0170544 A1* | 7/2008 | Tang | H04W 74/006 370/329 |
| 2010/0177756 A1* | 7/2010 | Choi | H04W 72/042 370/338 |
| 2010/0214997 A1* | 8/2010 | Tao | H04W 16/12 370/329 |
| 2011/0222510 A1* | 9/2011 | Benjamins | H04W 48/12 370/331 |
| 2012/0057552 A1 | 3/2012 | Ginzburg et al. | |
| 2012/0257569 A1 | 10/2012 | Jang et al. | |
| 2013/0121337 A1* | 5/2013 | Nguyen | H04L 45/54 370/392 |
| 2013/0176926 A1 | 7/2013 | Lee et al. | |
| 2013/0195036 A1 | 8/2013 | Quan et al. | |
| 2013/0201866 A1* | 8/2013 | Wentink | H04W 76/14 370/253 |
| 2014/0050133 A1 | 2/2014 | Jafarian et al. | |
| 2014/0098724 A1 | 4/2014 | Park et al. | |
| 2014/0211703 A1* | 7/2014 | Seok | H04W 72/0406 370/329 |
| 2014/0254452 A1 | 9/2014 | Elbwart et al. | |
| 2014/0328195 A1 | 11/2014 | Sampath et al. | |
| 2015/0103713 A1 | 4/2015 | Lee et al. | |
| 2015/0195115 A1 | 7/2015 | Yu et al. | |
| 2015/0373587 A1* | 12/2015 | Josiam | H04L 5/0028 370/338 |
| 2016/0088602 A1 | 3/2016 | Seok | |
| 2016/0143006 A1* | 5/2016 | Ghosh | H04W 74/004 370/329 |
| 2016/0242114 A1 | 8/2016 | Jung et al. | |
| 2016/0352547 A1 | 12/2016 | Guo et al. | |
| 2017/0006581 A1* | 1/2017 | Matsuo | H04W 72/02 |
| 2018/0020475 A1* | 1/2018 | Kim | H04W 84/12 |
| 2018/0152935 A1 | 5/2018 | Hedayat | |
| 2018/0220437 A1* | 8/2018 | Li | H04W 72/1236 |
| 2019/0313404 A1 | 10/2019 | Chu et al. | |

FOREIGN PATENT DOCUMENTS

| | | | |
|---|---|---|---|
| CN | 103476037 A | 12/2013 | |
| CN | 104081858 A | * 10/2014 | ......... H04W 72/085 |
| CN | 104081858 A | 10/2014 | |
| CN | 104584649 A | 4/2015 | |
| CN | 104584649 A | * 4/2015 | ........ H04W 52/0293 |
| CN | 104661224 A | 5/2015 | |
| EP | 2309662 A2 | 4/2011 | |
| EP | 2595425 A1 | 5/2013 | |
| EP | 2858437 A1 | 4/2015 | |
| JP | 2013509784 A | 3/2013 | |
| JP | 2015510342 A | 4/2015 | |
| JP | 2016524837 A | 8/2016 | |
| KR | 20100009493 A | 1/2010 | |
| KR | 20100130608 A | 12/2010 | |
| KR | 20140130693 A | 11/2014 | |
| KR | 20150022874 A | 3/2015 | |
| WO | 2009158228 A2 | 12/2009 | |
| WO | 2011099798 A2 | 8/2011 | |
| WO | 2014179579 A1 | 11/2014 | |

OTHER PUBLICATIONS

Zhao et al., "Notification on Change of BW & Rx Nss," IEEE802.11-10/1254-00-00ac, pp. 1-8, Institute of Electrical and Electronics Engineers, New York, New York (Nov. 8, 2010).

"IEEE Standard for Information technology—Telecommunications and information exchange between systems Local and metropolitan area networks—Specific requirements, Part 11: Wireless LAN Medium Access Conlrol (MAC) and Physical Layer (PHY) Specifications Amendment 4: Enhancements for Very High Throughput for Operation in Bands below 6 GHz," 802.11ac-2013, IEEE Computer Society, Institute of Electrical and Electronics Engineers, New York, New York (Approved Dec. 11, 2013).

\* cited by examiner

DATA TRANSMISSION METHOD, ACCESS POINT, AND STATION

CROSS-REFERENCE TO RELATED APPLICATIONS

This application is a continuation of U.S. patent application Ser. No. 15/870,137, filed on Jan. 12, 2018, which is a continuation of International Application No. PCT/CN2015/084232, filed on Jul. 16, 2015. All of the afore-mentioned patent applications are hereby incorporated by reference in their entireties.

TECHNICAL FIELD

Embodiments of the present invention relate to the communications field, and in particular, to a data transmission method, an access point, and a station.

BACKGROUND

To meet a requirement of a large system throughput, a current communications system forces all stations (STA) to support an 80 MHz transmission bandwidth mode. By using large bandwidth, a station can complete data transmission in a relatively short time, so as to reduce data transmission time and reduce data transmit power and receive power. However, when there is a relatively low requirement for uplink and downlink data transmission, large bandwidth used for data transmission is in an idle state for most of time. In this case, the station listens to a channel continuously, so that when there is an uplink or downlink data transmission requirement, the station determines, according to a channel status obtained by means of listening, whether data transmission can be performed. The channel status includes "channel idle" and "channel busy". Undoubtedly, a process of continuously listening to a relatively wide channel greatly increases power consumption of the station. In addition, an anti-interference capability of the station is weak.

Based on this, a method for dynamically adjusting bandwidth by a station during operating is introduced in the conventional art. Specifically, when there is a relatively low requirement for uplink and downlink data transmission, the station switches the 80 MHz transmission bandwidth mode supported by the station to a bandwidth power saving mode (BWPS mode), and notifies, by sending an operating mode notification frame, an access point of a bandwidth mode currently supported by the station. The bandwidth power saving mode refers to a bandwidth mode in which available bandwidth of the station is less than 80 MHz (for example, the available bandwidth is 20 MHz, 40 MHz, or 60 MHz). In the bandwidth power saving mode, a channel on which the station performs data transmission includes a primary channel.

The foregoing method can reduce channel listening power consumption of the station to some extent when there is a relatively low requirement for uplink and downlink data transmission. However, when data needs to be transmitted between an access point and a station in a bandwidth power saving mode, because the station in the bandwidth power saving mode occupies a primary channel, during communication with the station occupying the primary channel, the access point can perform data transmission with this station only, and the access point can perform data transmission for the station only by using an operating channel of this station. Because the station is in the bandwidth power saving mode, for the access point, the operating channel of this station occupies only a part of available bandwidth resources of the access point, and all bandwidth resources except for the operating channel of this station are wasted. This reduces resource utilization of the access point.

SUMMARY

This application provides a data transmission method, an access point, and a station, so as to resolve a problem that resource utilization of an access point is low when a station in a bandwidth power saving mode occupies a primary channel and during communication with the station occupying the primary channel, the access point can transmit data with the station only.

To achieve the foregoing objective, this application provides the following technical solutions.

A first aspect of this application provides a data transmission method, including:

performing, by an access point, data transmission with a first station by using an operating channel of the first station, where the first station enables a bandwidth power saving mode, and the operating channel of the first station is an available channel of the first station; and when the access point performs data transmission with the first station by using the operating channel of the first station, performing, by the access point, data transmission with a second station by using an operating channel of the second station, where the operating channel of the first station and the operating channel of the second station form all or a part of available channels of the access point.

With reference to the first aspect, in a first implementation of the first aspect, before the performing, by an access point, data transmission with the first station by using an operating channel of the first station, the method further includes: instructing, by the access point, the first station to enable the bandwidth power saving mode, where a process of the instructing, by the access point, the first station to enable the bandwidth power saving mode specifically includes:

sending, by the access point, first signaling, where the first signaling is used to instruct to enable the bandwidth power saving mode, and indicate a first channel set available to the first station, and total bandwidth of channels in the first channel set is less than bandwidth of the available channels of the access point.

With reference to the first aspect, in a second implementation of the first aspect, before the performing, by an access point, data transmission with the first station by using an operating channel of the first station, the method further includes:

receiving, by the access point, a request for enabling the bandwidth power saving mode from the first station, where the request carries a second channel set, the second channel set is an available channel, requested by the first station from the access point, in the bandwidth power saving mode, and total bandwidth of channels in the second channel set is less than bandwidth of the available channels of the access point; and sending, by the access point, a request response to the first station, where the request response carries a third channel set, and total bandwidth of channels in the third channel set is less than the bandwidth of the available channels of the access point.

With reference to the first aspect, the first implementation of the first aspect, or the second implementation of the first aspect, in a third implementation of the first aspect, the method further includes:

sending, by the access point, an update instruction to the station in the bandwidth power saving mode, where the update instruction is used to indicate an updated channel set allocated by the access point to the station in the bandwidth power saving mode, total bandwidth of channels in the updated channel set is less than the bandwidth of the available channels of the access point, and the updated channel set is different from a to-be-updated channel set of the station in the bandwidth power saving mode.

With reference to the first aspect, the first implementation of the first aspect, the second implementation of the first aspect, or the third implementation of the first aspect, in a fourth implementation of the first aspect, the performing, by an access point, data transmission with the first station by using an operating channel of the first station includes:

receiving, by the access point by using the operating channel of the first station, data that starts to be sent by the first station at a preset sending time point, where the preset sending time point is specified by the access point; and the performing, by the access point, data transmission with a second station by using an operating channel of the second station includes:

receiving, by the access point by using the operating channel of the second station, data that starts to be sent by the second station at a preset sending time point, where the operating channel of the first station is a subset of a channel set of the first station in the bandwidth power saving mode; when the second station enables the bandwidth power saving mode, the operating channel of the second station is a subset of a channel set of the second station in the bandwidth power saving mode; and the operating channel of the first station and the operating channel of the second station do not overlap.

With reference to the fourth implementation of the first aspect, in a fifth implementation of the first aspect, before the performing, by an access point, data transmission with the first station by using an operating channel of the first station, the method further includes:

sending, by the access point to the first station, a first trigger frame used to indicate the operating channel of the first station; and before the access point performs data transmission with the second station by using the operating channel of the second station, sending, to the second station, a second trigger frame used to indicate the operating channel of the second station, where the first trigger frame is used to trigger the first station to start to send data at the preset sending time point, and the second trigger frame is used to trigger the second station to start to send data at the preset sending time point.

With reference to the first aspect, the first implementation of the first aspect, the second implementation of the first aspect, the third implementation of the first aspect, the fourth implementation of the first aspect, or the fifth implementation of the first aspect, in a sixth implementation of the first aspect, the performing, by an access point, data transmission with the first station by using an operating channel of the first station includes:

sending, by the access point, a physical layer protocol data unit PPDU to the first station by using the operating channel of the first station, where the PPDU includes service data, indication signaling used to indicate a data receiving manner of the first station, a preamble used to indicate the operating channel of the first station, and control signaling used to indicate a data-sending resource of the first station; and the performing, by the access point, data transmission with a second station by using an operating channel of the second station includes:

sending, by the access point, a PPDU to the second station by using the operating channel of the second station, where the PPDU includes service data, indication signaling used to indicate a data receiving manner of the second station, and a preamble used to indicate the operating channel of the second station, where the operating channel of the first station is a subset of the channel set of the first station in the bandwidth power saving mode; when the second station enables the bandwidth power saving mode, the operating channel of the second station is a subset of the channel set of the second station in the bandwidth power saving mode, and a subset of the channel set of the second station in the bandwidth power saving mode is the operating channel of the second station; and the operating channel of the first station and the operating channel of the second station do not overlap.

With reference to the first aspect, the first implementation of the first aspect, the second implementation of the first aspect, the third implementation of the first aspect, the fourth implementation of the first aspect, the fifth implementation of the first aspect, or the sixth implementation of the first aspect, in a seventh implementation of the first aspect, there is one or more second stations.

A second aspect of this application provides a data transmission method, including:

enabling, by a station, a bandwidth power saving mode; and performing, by the station enabling the bandwidth power saving mode, data transmission with an access point by using an operating channel, where the operating channel is an available channel, in the bandwidth power saving mode, of the station, and the access point is configured to perform, by using an operating channel of a second station, data transmission with the second station when performing data transmission with the station, where the operating channel of the station and the operating channel of the second station form all or a part of available channels of the access point.

With reference to the second aspect, in a first implementation of the second aspect, the enabling, by a station, a bandwidth power saving mode includes:

sending, by the station, a request to the access point, where the request carries a fourth channel set, and the fourth channel set is an available channel requested by the station from the access point, and total bandwidth of channels in the fourth channel set is less than bandwidth of the available channels of the access point; and receiving, by the station, a request response sent by the access point, where the request response carries a fifth channel set, and total bandwidth of channels in the fifth channel set is less than the bandwidth of the available channels of the access point.

With reference to the second aspect, in a second implementation of the second aspect, the enabling, by a station, a bandwidth power saving mode includes:

receiving, by the station, second signaling sent by the access point, where the second signaling is used to instruct the station to enable the bandwidth power saving mode, and indicate a sixth channel set available to the station, and total bandwidth of channels in the sixth channel set is less than bandwidth of the available channels of the access point.

With reference to the second aspect, the first implementation of the second aspect, or the second implementation of the second aspect, in a third implementation of the second aspect, after the enabling, by a station, a bandwidth power saving mode, the method further includes: sending, by the station, an update request to the access point, where the update request carries a seventh channel set, total bandwidth of channels in the seventh channel set is less than the bandwidth of the available channels of the access point, and the seventh channel set is different from a to-be-updated channel set of the station in the bandwidth power saving mode; and receiving, by the station, a response returned by the access point for the update request, where the response is used to instruct to change the channel set of the station to the seventh channel set.

With reference to the second aspect, the first implementation of the second aspect, or the second implementation of the second aspect, in a fourth implementation of the second aspect, after the enabling, by a station, a bandwidth power saving mode, the method further includes:

receiving, by the station, an update instruction sent by the access point, where the update instruction is used to indicate an updated channel set allocated by the access point to the station, where total bandwidth of channels in the updated channel is less than the bandwidth of the available channels of the access point, and the updated channel set is different from a to-be-updated channel set of the station in the bandwidth power saving mode.

A third aspect of this application provides an access point, including:

a first data transmission unit, configured to perform data transmission with a first station by using an operating channel of the first station, where the first station enables a bandwidth power saving mode, and the operating channel of the first station is an available channel of the first station; and a second data transmission unit, configured to: when data transmission with the first station is performed by using the operating channel of the first station, perform data transmission with a second station by using an operating channel of the second station, where the operating channel of the first station and the operating channel of the second station form all or a part of available channels of the access point.

With reference to the third aspect, in a first implementation of the third aspect, the access point further includes:

a signaling sending unit, configured to: before data transmission with the first station is performed by using the operating channel of the first station, send first signaling to the first station, where the first signaling is used to instruct to enable the bandwidth power saving mode, and indicate a first channel set available to the first station, and total bandwidth of channels in the first channel set is less than bandwidth of the available channels of the access point.

With reference to the third aspect, in a second implementation of the third aspect, the access point further includes:

a receiving unit, configured to: before data transmission with the first station is performed by using the operating channel of the first station, receive a request for enabling the bandwidth power saving mode from the first station, where the request carries a second channel set, the second channel set is an available channel, requested by the first station from the access point, in the bandwidth power saving mode, and total bandwidth of channels in the second channel set is less than bandwidth of the available channels of the access point; and a responding unit, configured to send a request response to the first station, where the request response carries a third channel set, and total bandwidth of channels in the third channel set is less than the bandwidth of the available channels of the access point.

With reference to the third aspect, the first implementation of the third aspect, or the second implementation of the third aspect, in a third implementation of the third aspect, the access point further includes:

an update instruction sending unit, configured to send an update instruction to the station in the bandwidth power saving mode, where the update instruction is used to indicate an updated channel set allocated by the access point to the station in the bandwidth power saving mode, total bandwidth of channels in the updated channel set is less than the bandwidth of the available channels of the access point, and the updated channel set is different from a to-be-updated channel set of the station in the bandwidth power saving mode.

With reference to the third aspect, the first implementation of the third aspect, the second implementation of the third aspect, or the third implementation of the third aspect, in a fourth implementation of the third aspect, that the first data transmission unit is configured to perform data transmission with the first station by using the operating channel of the first station includes:

the first data transmission unit is specifically configured to receive, by using the operating channel of the first station, data that starts to be sent by the first station at a preset sending time point, where the preset sending time point is specified by the access point; and that the second data transmission unit is configured to perform data transmission with the second station by using the operating channel of the second station includes:

the second data transmission unit is specifically configured to receive, by using the operating channel of the second station, data that starts to be sent by the second station at a preset sending time point, where the operating channel of the first station is a subset of a channel set of the first station in the bandwidth power saving mode; when the second station enables the bandwidth power saving mode, the operating channel of the second station is a subset of a channel set of the second station in the bandwidth power saving mode; and the operating channel of the first station and the operating channel of the second station do not overlap.

With reference to the fourth implementation of the third aspect, in a fifth implementation of the third aspect, the access point further includes:

a trigger frame sending unit, configured to: before the first data transmission unit performs data transmission with the first station by using the operating channel of the first station, send, to the first station, a first trigger frame used to indicate the operating channel of the first station; and before the second station transmission unit performs data transmission with the second station by using the operating channel of the second station, send, to the second station, a second trigger frame used to indicate the operating channel of the second station, where the first trigger frame is used to trigger the first station to start to send data at the preset sending time point, and the second trigger frame is used to trigger the second station to start to send data at the preset sending time point.

With reference to the third aspect, the first implementation of the third aspect, the second implementation of the third aspect, the third implementation of the third aspect, the fourth implementation of the third aspect, or the fifth implementation of the third aspect, in a sixth implementation of the third aspect, that the first data transmission unit is configured to perform data transmission with the first station by using the operating channel of the first station includes:

the first data transmission unit is specifically configured to send a physical layer protocol data unit PPDU to the first station by using the operating channel of the first station, where the PPDU includes service data, indication signaling used to indicate a data receiving manner of the first station, a preamble used to indicate the operating channel of the first station, and control signaling used to indicate a data-sending resource of the first station; and that the second data transmission unit is configured to perform data transmission with the second station by using the operating channel of the second station includes:

the second data transmission unit is specifically configured to send a PPDU to the second station by using the operating channel of the second station, where the PPDU includes service data, indication signaling used to indicate a data receiving manner of the second station, and a preamble used to indicate the operating channel of the second station, where the operating channel of the first station is a subset of the channel set of the first station in the bandwidth power saving mode; when the second station enables the bandwidth power saving mode, the operating channel of the second station is a subset of the channel set of the second station in the bandwidth power saving mode, and a subset of the channel set of the second station in the bandwidth power saving mode is the operating channel of the second station; and the operating channel of the first station and the operating channel of the second station do not overlap.

With reference to the third aspect, the first implementation of the third aspect, the second implementation of the third aspect, the third implementation of the third aspect, the fourth implementation of the third aspect, the fifth implementation of the third aspect, or the sixth implementation of the third aspect, in a seventh implementation of the third aspect, that the second data transmission unit is configured to perform data transmission with the second station by using the operating channel of the second station includes:

the second data transmission unit is specifically configured to perform data transmission with the second station by using the operating channel of the second station, where there is one or more second stations.

A fourth aspect of this application provides a station, including:

a bandwidth power saving mode enabling unit, configured to enable a bandwidth power saving mode, where the station enabling the bandwidth power saving mode performs data transmission with an access point by using an operating channel, where the operating channel is an available channel, in the bandwidth power saving mode, of the station, and the access point is configured to perform, by using an operating channel of a second station, data transmission with the second station when performing data transmission with the station, where the operating channel of the station and the operating channel of the second station form all or a part of available channels of the access point.

With reference to the fourth aspect, in a first implementation of the fourth aspect, the bandwidth power saving mode enabling unit includes:

a request sending subunit, configured to send a request to the access point, where the request carries a fourth channel set, the fourth channel set is an available channel requested by the station from the access point, and total bandwidth of channels in the fourth channel set is less than bandwidth of the available channels of the access point; and a receiving subunit, configured to receive a request response sent by the access point, where the request response carries a fifth channel set, and total bandwidth of channels in the fifth channel set is less than the bandwidth of the available channels of the access point.

With reference to the fourth aspect, in a second implementation of the fourth aspect, that the bandwidth power saving mode enabling unit is configured to enable the bandwidth power saving mode includes:

the bandwidth power saving mode enabling unit is specifically configured to receive second signaling sent by the access point, where the second signaling is used to instruct the station to enable the bandwidth power saving mode, and indicate a sixth channel set available to the station, and total bandwidth of channels in the sixth channel set is less than bandwidth of the available channels of the access point.

With reference to the fourth aspect, the first implementation of the fourth aspect, or the second implementation of the fourth aspect, in a third implementation of the fourth aspect, the station further includes:

an update request sending unit, configured to: after the station enables the bandwidth power saving mode, send an update request to the access point, where the update request carries a seventh channel set, total bandwidth of channels in the seventh channel set is less than the bandwidth of the available channels of the access point, and the seventh channel set is different from a to-be-updated channel set of the station in the bandwidth power saving mode; and an update instruction receiving unit, configured to receive a response returned by the access point for the update request, where the response is used to instruct to change the channel set of the station to the seventh channel set.

With reference to the fourth aspect, the first implementation of the fourth aspect, or the second implementation of the fourth aspect, in a fourth implementation of the fourth aspect, the update instruction receiving unit is further configured to:

after the station enables the bandwidth power saving mode, receive an update instruction sent by the access point, where the update instruction is used to indicate an updated channel set allocated by the access point to the station, total bandwidth of channels in the updated channel set is less than the bandwidth of the available channels of the access point, and the updated channel set is different from a to-be-updated channel set of the station in the bandwidth power saving mode.

According to the data transmission method provided in this application, an access point performs, by using an operating channel of a second station, data transmission with the second station when performing data transmission with a first station in a bandwidth power saving mode by using an operating channel of the first station. Even if the operating channel of the first station includes a primary channel, the access point can still perform data transmission with the second station by using another channel. Further, for the access point, although the operating channel of the first station occupies only a part of available bandwidth resources of the access point, the access point can still perform data transmission with the second station by using another channel. In this way, all bandwidth resources of the access point except for the operating channel of the first station can also be used for data transmission at the same time, improving resource utilization of the access point.

BRIEF DESCRIPTION OF DRAWINGS

To describe the technical solutions in the embodiments of the present invention or in the conventional art more clearly, the following briefly describes the accompanying drawings required for describing the embodiments or the conventional art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Solutions of this application may be applied to a wireless local area network (WLAN). Currently, a standard used by the WLAN is the Institute of Electrical and Electronics Engineers (IEEE) 802.11 series. The WLAN may include multiple basic service sets (BSS), and network nodes in the basic service sets are stations (STA).

A station includes an access point station, also known as an access point (AP), and a non access point station (Non-AP STA). Each basic service set may include one AP and multiple non-AP STAs associated with the AP.

APs, with a typical coverage radius of tens to hundreds of meters, are mainly deployed inside a family, a building, and a campus. Certainly, APs may also be deployed outdoors. An AP, equivalent to a bridge connecting a wired network and a wireless network, is mainly used to connect various wireless network clients together, and then connect the wireless network to an Ethernet. Specifically, the AP may be a terminal device or a network device having a wireless fidelity (WiFi) chip. Optionally, the AP may be a device that supports the 802.11ax standard. Further optionally, the AP may be a device that supports various WLAN standards such as 802.11ac, 802.11n, 802.11g, 802.11b, and 802.11a.

The non access point station may be a wireless communications chip, a wireless sensor, or a wireless communications terminal, for example, a mobile phone that supports WiFi communication, a tablet PC that supports WiFi communication, a set top box that supports WiFi communication, a smart TV that supports WiFi communication, a smart wearable device that supports WiFi communication, an in-vehicle communications device that supports WiFi communication, and a computer that supports WiFi communication. Optionally, the station can support the 802.11ax standard. Further optionally, the station supports various WLAN standards such as 802.11ac, 802.11n, 802.11g, 802.11b, and 802.11a.

Figure 1:
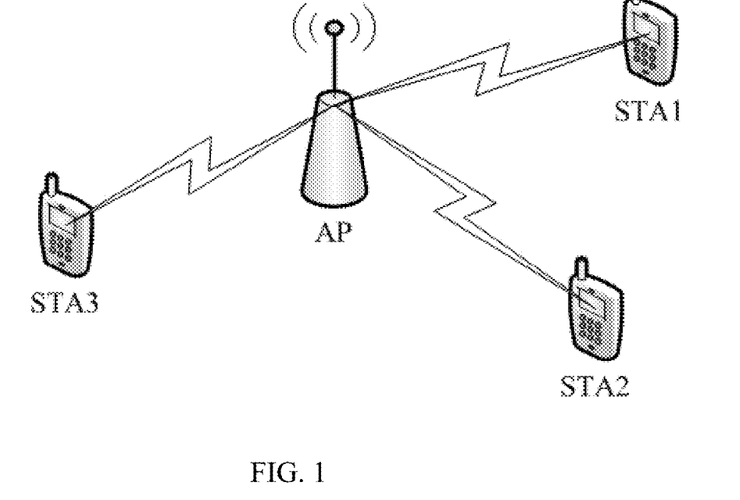
FIG. 1 is a schematic diagram of a system in a WLAN deployment scenario.

FIG. 1 is a schematic diagram of a system in a typical WLAN deployment scenario, in which one AP and three STAs are included, and the AP performs communication with a STA1, a STA2, and a STA3 separately. In the system, maximum bandwidth supported by the access point is greater than maximum bandwidth supported by a station in a power saving mode. For example, if the maximum bandwidth supported by the station in the power saving mode is 20 MHz, the maximum bandwidth supported by the access point may be 40 MHz, 80 MHz, 160 MHz, or the like. For a station in a non-power saving mode, maximum bandwidth supported by the station is not greater than the maximum bandwidth supported by the access point, but is greater than the maximum bandwidth supported by the station in the power saving mode. For example, if the maximum bandwidth supported by the station in the power saving mode is 20 MHz, and the maximum bandwidth supported by the access point may be 80 MHz or 160 MHz, the maximum bandwidth supported by the station in the non-power saving mode may be 80 MHz or 160 MHz, or the like.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 2:
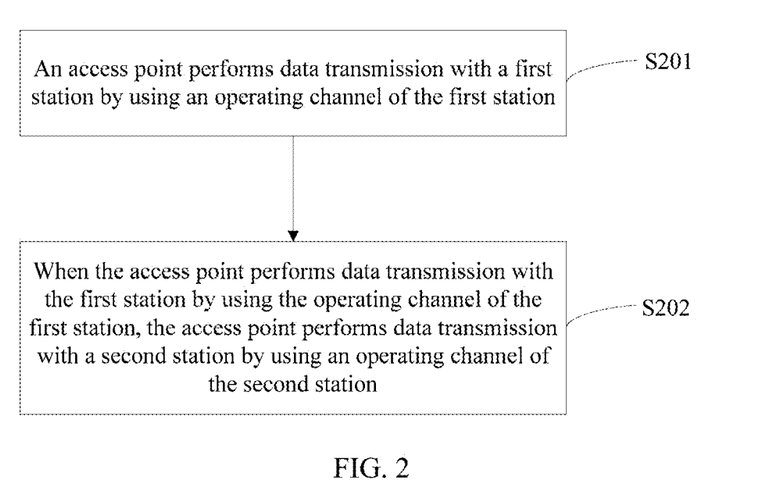
FIG. 2 is a schematic flowchart of a data transmission method according to an embodiment of this application.

An embodiment of this application provides a data transmission method. As shown in FIG. 2, the method includes the following steps.

S201. An access point performs data transmission with a first station by using an operating channel of the first station, where the first station enables a bandwidth power saving mode, and the operating channel is an available channel of the first station.

S202. When the access point performs data transmission with the first station by using the operating channel of the first station, the access point performs data transmission with a second station by using an operating channel of the second station, where the operating channel of the first station and the operating channel of the second station form all or a part of available channels of the access point. Data mentioned in the present invention includes a combination (convergence) of one or more of data from a MAC layer and an upper layer, a MAC-layer management frame, and a MAC-layer control frame.

The first station in this embodiment is a station that enables a bandwidth power saving mode. The bandwidth power saving mode means that maximum available transmission bandwidth is less than available transmission bandwidth of a system. For example, if transmission bandwidth of the system is 80 MHz, transmission bandwidth in the bandwidth power saving mode may be 20 MHz, 40 MHz, or 60 MHz. Certainly, this is not limited thereto. That is, the available transmission bandwidth of the station that enables the bandwidth power saving mode is less than the available transmission bandwidth of the system.

The data transmission in this embodiment includes data receiving and sending. Accordingly, that the access point performs data transmission with the first station by using the operating channel includes: the access point receives, by using the operating channel, uplink data sent by the first station, and the access point sends, by using the operating channel, downlink data to the first station. Similarly, that the access point performs data transmission with the second station by using a remaining channel includes: the access point receives, by using the remaining channel, uplink data sent by the second station, and the access point sends, by using the remaining channel, downlink data to the second station. A specific uplink or downlink transmission process is described in the following embodiments.

In this embodiment, there may be one or more second stations. When there are multiple second stations, and when the operating channel of the first station and the operating channels of the second stations are a part of available channels of the access point, the access point can perform, by using another channel, data transmission with another second station at the same time when transmitting data to the first station and one second station. A quantity of second stations may be jointly determined according to an amount of data that can be transmitted by using bandwidth of a system channel and an amount of data that is transmitted between the access point and the station.

In this embodiment, the second station may enable the bandwidth power saving mode or may not enable the bandwidth power saving mode.

According to the data transmission method provided in this embodiment of the present invention, when performing data transmission with a first station in a bandwidth power saving mode by using an operating channel of the first station, an access point performs data transmission with a second station by using an operating channel of the second station. That is, the operating channel of the second station is another channel different from the operating channel of the first station. Therefore, even if the operating channel of the first station includes a primary channel, the access point can still perform data transmission with the second station by using the another channel. Further, for the access point, although the operating channel of the first station occupies only a part of available bandwidth resources of the access point, the access point can still perform data transmission with the second station by using another channel, so that all bandwidth resources of the access point except for the operating channel of the first station can also be used for data transmission at the same time. This improves resource utilization of the access point.

Embodiment 2

Figure 3:
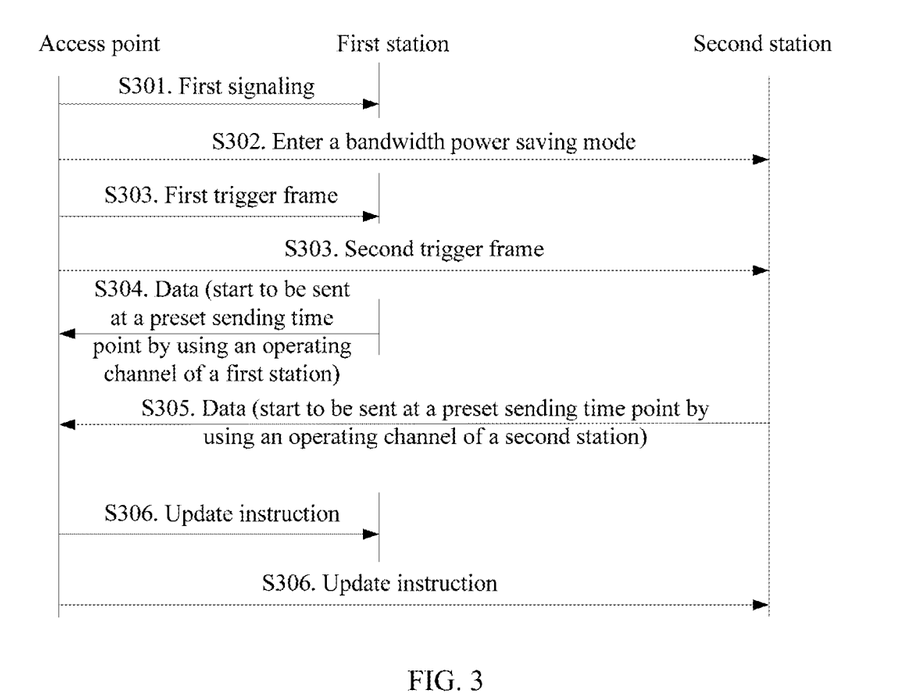
FIG. 3 is a schematic flowchart of another data transmission method according to an embodiment of this application.

An embodiment of this application provides another data transmission method. In this embodiment, further descriptions are provided from the perspective of uplink transmission. Specifically, as shown in FIG. 3, the method includes the following steps.

S301. An access point sends first signaling to a first station, where the first signaling is used to instruct the first station to enable a bandwidth power saving mode, and indicate a first channel set available to the first station, and total bandwidth of channels in the first channel set is less than bandwidth of an available channel of the access point.

When battery power of a station is relatively low, an application layer instructs the station to enable the bandwidth power saving mode, an amount of uplink or downlink data is reduced, or multiple channels receive great interference, and only some channels are in good conditions, the access point can initiate a process for controlling the station to enable the bandwidth power saving mode, and the station enabling the bandwidth power saving mode listens to and/or transmits data only on a channel set (such as the first channel set) that has been agreed by the station with the access point.

In this embodiment, the first signaling may carry an identifier of the first station, and there is a one-to-one correspondence between the identifier of the first station and the first channel set. After receiving the first signaling, the first station determines, according to the correspondence between the identifier of the first station and the first channel set and the identifier of the first station, the first channel set indicated by the first signaling.

It should be noted that, when the access point controls the first station to enable the bandwidth power saving mode, the access point may consider, without obtaining an acknowledgment ACK from the first station, that the first station has enabled the bandwidth power saving mode and performed data transmission with the access point by using an operating channel of the first station. The reason is that even if the first station has not successfully enabled the bandwidth power saving mode as instructed by the access point, the access point can still perform data transmission with the first station normally.

S302. The access point controls a second station to enable the bandwidth power saving mode. Specifically, for a control manner, reference may be made to S301.

That is, the second station in this embodiment is also a station in the bandwidth power saving mode. In this embodiment, the access point performs data transmission with two stations in the bandwidth power saving mode at the same time.

As described in the foregoing embodiment, when the access point also performs data transmission with another station by using another channel, if the another station is a station in the bandwidth power saving mode, the first signaling may also carry an identifier of the another station. If the another station includes multiple stations and the multiple stations are group stations, the first signaling may carry a group address of the group stations. Certainly, the first signaling may alternatively carry a broadcast address, and the broadcast address is corresponding to all stations served by the access point.

It should be noted that an execution sequence of step S301 and step S302 is not limited. That is, step S301 may be performed before step S302, or may be performed after step S302.

S303. The access point sends, to the first station, a first trigger frame used to indicate an operating channel of the first station, and sends, to the second station, a second trigger frame used to indicate an operating channel of the second station.

The first trigger frame is used to trigger the first station to start to send data at a preset sending time point, and the second trigger frame is used to trigger the second station to start to send data at a preset sending time point. The operating channel of the first station is a subset of the first channel set. The operating channel of the first station and the operating channel of the second station are a part or all of available channels of the access point.

A trigger frame in this embodiment is used to trigger a station to send uplink data, and the trigger frame implements time alignment for sending of the uplink data by indicating start times of data sending to the first station and the second station.

In this embodiment, the first channel set that the access point allocates to the first station may be the same as or different from a channel set that the access point allocates to the second station. However, regardless of whether the two channel sets are the same, when an FDMA manner (frequency division multiple access, such as an OFDMA manner) is used, to avoid collision between two stations during data sending, operating channels based on the two channel sets should not overlap. When another manner (such as MU-MIMO) is used, channels of the two channel sets can overlap.

A subset of a channel set in this embodiment includes a channel set or a part of a channel set.

S304. The first station starts to send data to the access point at a preset sending time point by using the operating channel of the first station.

S305. The second station starts to send data to the access point at a preset sending time point by using the operating channel of the second station.

It should be noted that an execution sequence of step S304 and step S305 is not limited. That is, step S304 may be performed before step S305, or may be performed after step S305.

S306. The access point sends an update instruction to a station in a bandwidth power saving mode, where the update instruction is used to instruct the access point to allocate an updated channel set to the station in the bandwidth power saving mode, total bandwidth of channels in the updated channel set is less than the bandwidth of the available channel of the access point, and the updated channel set is different from a to-be-updated channel set of the station in the bandwidth power saving mode.

In this embodiment, the update instruction is used to update a power saving mode of the station. Regardless of the first station or the second station, a to-be-updated channel set is different from an updated channel set, which specifically includes:

when total bandwidth of channels in the to-be-updated channel set is different from total bandwidth of channels in the updated channel set, the channels in the to-be-updated channel set are completely different from the channels in the updated channel set; and/or the channels in the to-be-updated channel set overlap with the channels in the updated channel set; and/or the channels in the to-be-updated channel set are exactly the same as the channels in the updated channel set.

When the total bandwidth of the channels in the to-be-updated channel set is the same as the total bandwidth of the channels in the updated channel set, the channels in the to-be-updated channel set are completely different from the channels in the updated channel set; and/or the channels in the to-be-updated channel set overlap with the channels in the updated channel set.

It should be noted that, in this embodiment, that A overlaps with B means only that there is an intersection of A and B.

For the foregoing cases of the channel sets before and after being updated, an example is provided for description.

Assuming that the available bandwidth of the access point is 80 MHz, the available bandwidth may be divided into four channels: a channel 1, a channel 2, a channel 3, and a channel 4. The channel 1 may be divided into a sub-channel 1 and a sub-channel 2. Each channel occupies bandwidth of 20 MHz, and each sub-channel occupies bandwidth of 10 MHz.

If the channel set before being updated includes the channel 1, the updated channel set may include the channel 3 and the channel 4 when channel bandwidth corresponding to the channel set before being updated is different from channel bandwidth corresponding to the updated channel set. This is a case in which the channels are completely different.

The updated channel set may alternatively include the channel 1 and the channel 2. In this case, the channels overlap, and an overlapping channel is the channel 2.

The updated channel set may alternatively include the sub-channel 1 of the channel 1. In this case, the channels are exactly the same (that is, all the channels are the channel 1).

It is assumed that the channel set before being updated includes the channel 1 and the channel 2.

When channel bandwidth corresponding to the channel set before being updated is the same as channel bandwidth corresponding to the updated channel set, the updated channel set may include the channel 3 and the channel 4; and/or the updated channel set may include the channel 2 and the channel 3, and an overlapping channel is the channel 2.

In this embodiment, the first station and the second station are both stations in the bandwidth power saving mode. The access point sends a trigger frame to the first station and the second station, where the trigger frame is used to trigger the first station and the second station to start to send data at a preset time, so as to implement time alignment for sending uplink data by the first station and the second station. In addition, because the operating channel of the first station does not overlap with the operating channel of the second station, the access point in this embodiment can simultaneously control hybrid sending of uplink data of two stations in the bandwidth power saving mode. This improves resource utilization of the access point.

After the first channel set is predetermined, the first station may send data to and receive data from the access point for many times.

It can be learned from the foregoing steps that, in this embodiment, when performing communication with a station in a bandwidth power saving mode, an access point may also perform communication with another station by using a remaining channel. In this way, resource utilization of the access point can be improved.

Embodiment 3

Figure 4:
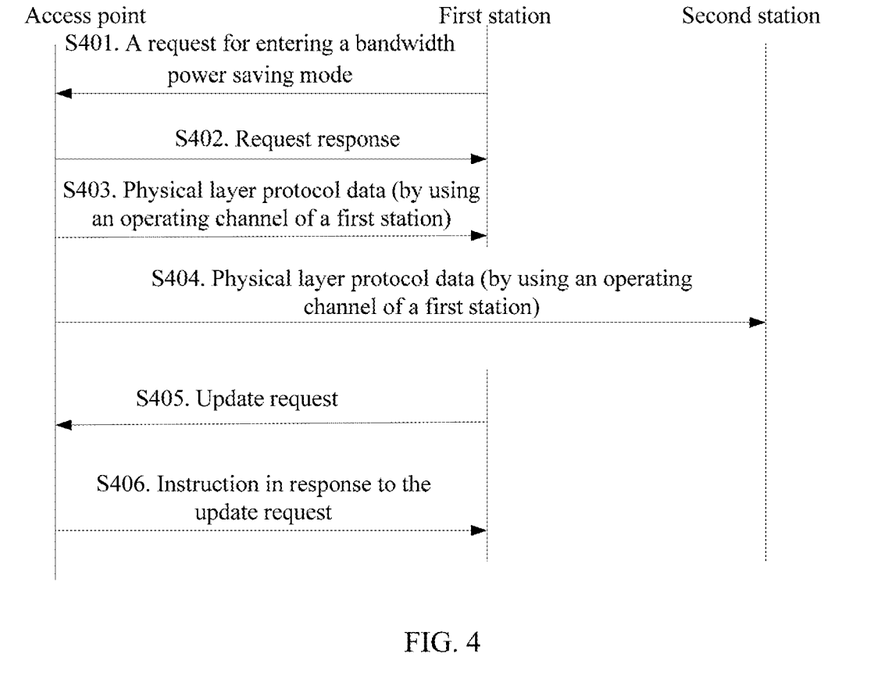
FIG. 4 is a schematic flowchart of another data transmission method according to an embodiment of this application.

An embodiment of this application provides still another data transmission method. In this embodiment, descriptions are provided from the perspective of downlink transmission. Specifically, as shown in FIG. 4, the method includes the following steps.

S401. A first station sends a request to an access point, where the request carries a fourth channel set, where the fourth channel set is an available channel requested by a station enabling a bandwidth power saving mode from the access point, and total bandwidth of channels in the fourth channel set is less than bandwidth of the available channel of the access point.

The available channel may be represented by using a channel number, an indication of a position offset from a primary channel of a current access point, or a center frequency and bandwidth of the channel.

Herein, it should be noted that the channel set requested by the station from the access point is the same as a channel set carried in a request received by the access point. For the "second channel set", "third channel set", and "fourth channel set" used in this application, "$X^{th}$" is only for clarity of description. In a scenario in which the access point interacts with the station, a channel set sent by a sender is a channel set received by a receiver.

S402. The access point sends a request response, where the request response carries a fifth channel set, and total bandwidth of channels in the fifth channel set is less than the bandwidth of the available channel of the access point.

In this embodiment, a process in which the first station enables a power saving mode is initiated by the first station itself. In this case, the first station can perform, only after receiving a request response returned by the access point, data transmission with the access point according to the channel set carried in the response.

In this embodiment, although a channel set requested by the first station in the request is the fourth channel set, based on a load balancing consideration, a channel set returned by the access point in response to the first station is not necessarily the fourth channel set. That is, in this case, the fourth channel set is different from the fifth channel set. For example, when a load on a channel corresponding to the fourth channel set is excessively heavy and a load on a channel corresponding to the fifth channel set is relatively light, the channel set returned by the access point in response to the first station is the fifth channel set.

Certainly, when the fourth channel set requested by the first station satisfies the load balancing consideration of the access point, the fifth channel set returned by the access point in response to the first station is the same as the fourth channel set. That is, in this case, the access point agrees on the fourth channel set requested by the first station, and the fifth channel set in the request response fed back by the access point is the fourth channel set.

S403. The access point sends a physical layer protocol data unit PPDU to the first station by using an operating channel of the first station.

Figure 5:
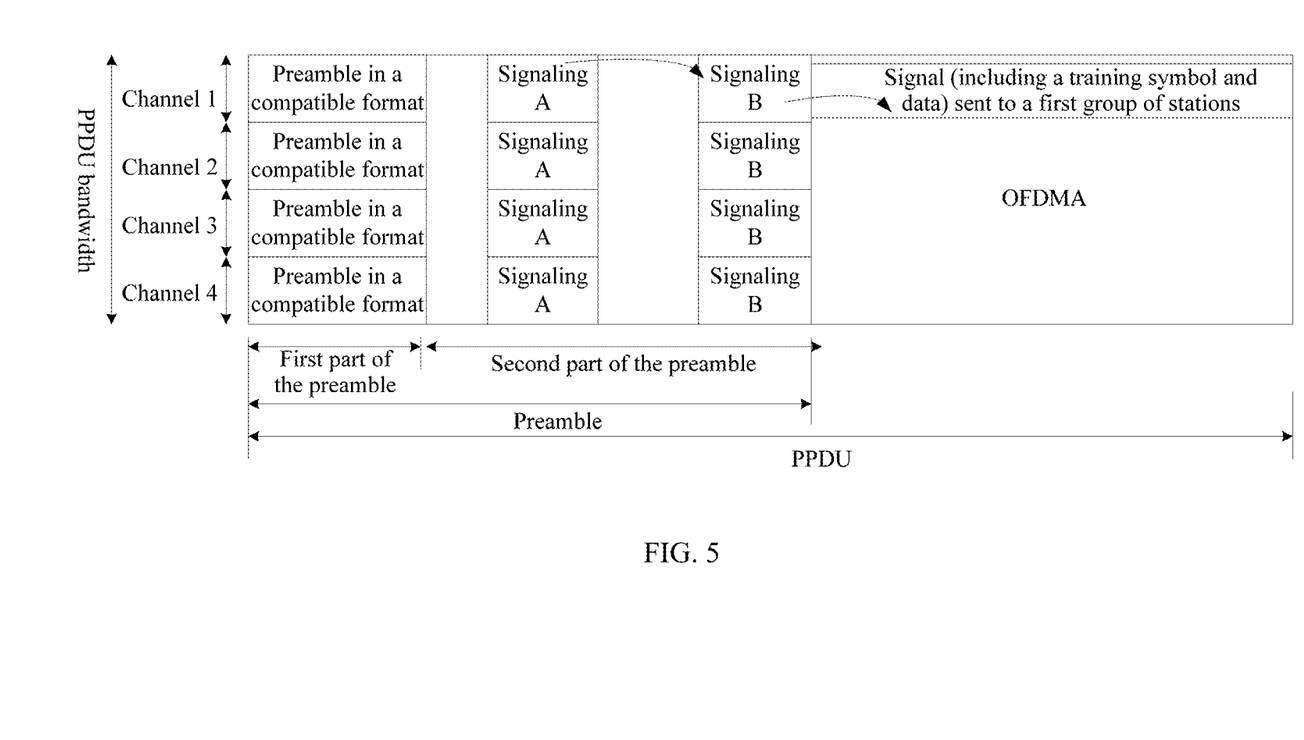
FIG. 5 is a schematic diagram of physical layer protocol data according to this application.

In this embodiment, as shown in FIG. 5, the PPDU includes service data, indication signaling (signaling A and signaling B) used to indicate a data receiving manner of the first station, a preamble used to indicate the operating channel of the first station, and control signaling used to indicate a data-sending resource of the first station. Specifically, the preamble may be a compatible preamble. Different signaling B information may be transmitted over different 20 MHz channels.

Operating channel indication information of the first station included in the preamble that is sent by the access point to the first station and that is used to indicate the operating channel of the first station is transmitted in the first channel set. Some preamble signals transmitted by the access point may be transmitted over a channel not in the first channel set, to serve users that perform transmission by using the channel not in the first channel set.

S404. The access point sends the PPDU to the second station by using an operating channel of the second station.

Figure 6:
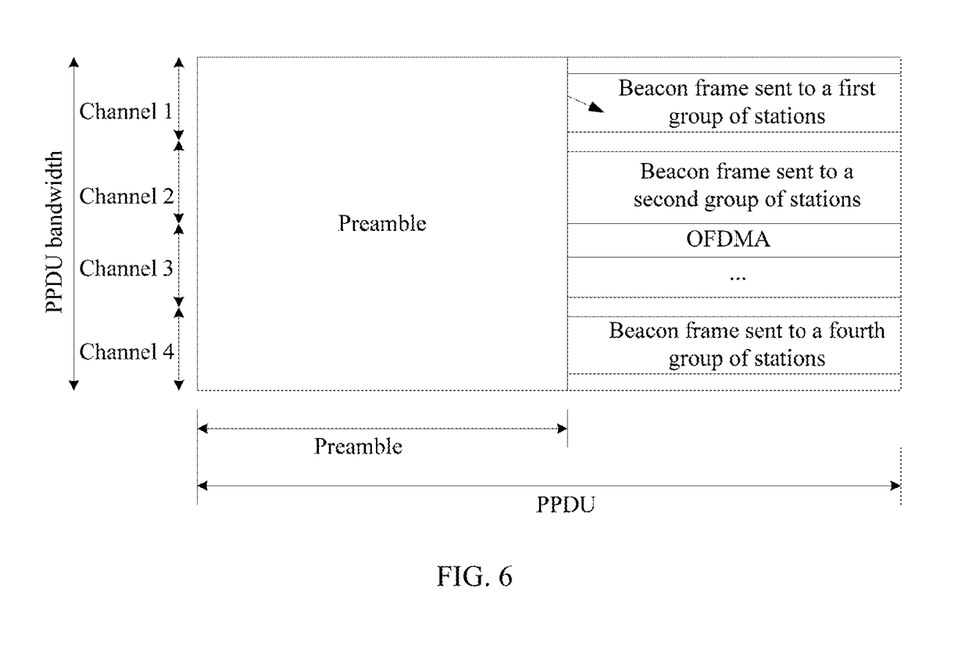
FIG. 6 is another schematic diagram of physical layer protocol data according to this application.

When the first station occupies a primary channel, to allow the second station to receive control information, specifically, as shown in FIG. 6, the PPDU sent to the second station includes service data, indication signaling used to indicate a data receiving manner of the second station, and a preamble used to indicate the operating channel of the second station, where indication information, that is, a beacon frame, may be carried in the operating channel of the second station.

Specifically, in this embodiment, the operating channel of the first station is a subset of a channel set of the first station in the bandwidth power saving mode; when the second station enables the bandwidth power saving mode, the operating channel of the second station is a subset of a channel set of the second station in the bandwidth power saving mode; and the operating channel of the first station and the operating channel of the second station do not overlap.

S405. The first station sends an update request to the access point, where the update request carries a seventh channel set, the seventh channel set is an updated channel set that is requested by the station in the bandwidth power saving mode from the access point, total bandwidth of channels in the seventh channel set is less than the bandwidth of the available channel of the access point, and the seventh channel set is different from a to-be-updated channel set of the station in the bandwidth power saving mode.

Certainly, the second station can also request an update, and details are not described herein again.

S406. The access point sends an instruction in response to the update request, where the instruction is used to instruct to change a channel set of the station to the seventh channel set.

It should be noted that an execution sequence of step S403 and step S404 is not limited. That is, step S403 may be performed before step S404, or may be performed after step S404.

In addition, in this embodiment, although an update for the bandwidth power saving mode of the first station is initiated by the first station, for a relationship between the channel sets before and after being updated, reference may be made to the previous embodiment.

In this embodiment, the first station is a station in the bandwidth power saving mode, and the second station is a station in a non bandwidth power saving mode. The access point sends a preamble to the first station and the second station, where the preamble is used to indicate operating channels for receiving downlink data by the first station and the second station, and the operating channel of the first station and the operating channel of the second station do not overlap. In this way, the access point can send downlink data to multiple stations at the same time, improving resource utilization of a node.

It should be noted that, for the data transmission methods shown in FIG. 3 and FIG. 4, in FIG. 3, the access point controls a station to enable the bandwidth power saving mode (S301 and S302), and in FIG. 4, a station proactively requests to enable the bandwidth power saving mode (S401 and S402). The two manners are interchangeable, and neither manner is limited to be forcedly applied to the uplink or downlink scenario described in the foregoing embodiments. Similarly, the update for the bandwidth power saving mode of a station may be initiated by the access point (S306), or may be initiated by the station proactively (S405). The two manners are interchangeable, and neither manner is limited to be forcedly applied to the uplink or downlink scenario described in the foregoing embodiments.

Embodiment 4

Figure 7:
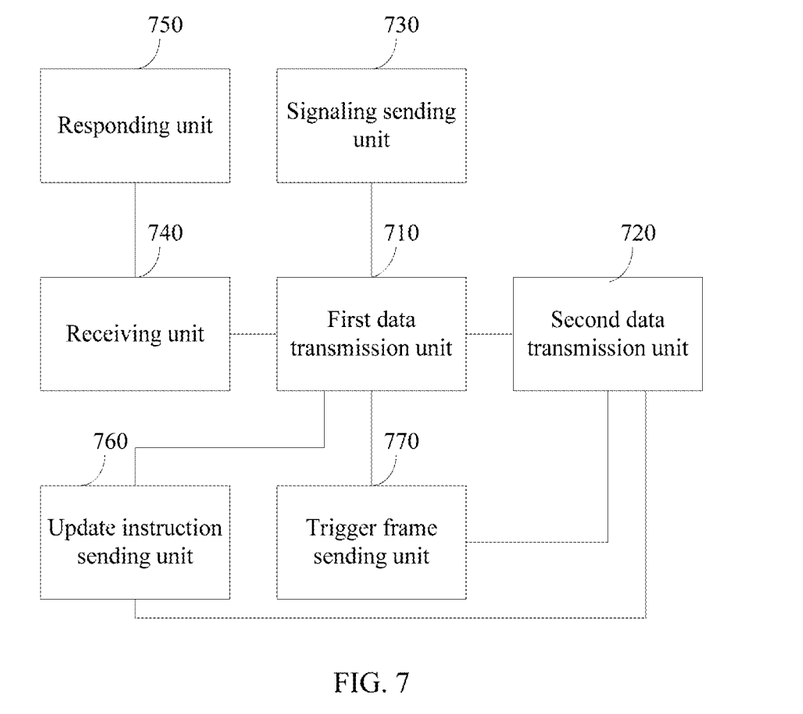
FIG. 7 is a schematic structural diagram of an access point according to an embodiment of this application.

Corresponding to the embodiments of the data transmission method, as shown in FIG. 7, an embodiment of this application provides an access point, including:

a first data transmission unit 710, configured to perform data transmission with a first station by using an operating channel of the first station, where the first station enables a bandwidth power saving mode, and the operating channel of the first station is an available channel of the first station; and a second data transmission unit 720, configured to: when data transmission with the first station is performed by using the operating channel of the first station, perform data transmission with a second station by using an operating channel of the second station, where the operating channel of the first station and the operating channel of the second station form all or a part of available channels of the access point.

Optionally, the access point provided in this embodiment may further include:

a signaling sending unit 730, configured to: before data transmission with the first station is performed by using the operating channel of the first station, send first signaling to the first station, where the first signaling is used to instruct to enable the bandwidth power saving mode, and indicate a first channel set available to the first station, and total bandwidth of channels in the first channel set is less than bandwidth of the available channels of the access point;

a receiving unit 740, configured to: before data transmission with the first station is performed by using the operating channel of the first station, receive a request for enabling the bandwidth power saving mode from the first station, where the request carries a second channel set, the second channel set is an available channel, requested by the first station from the access point, in the bandwidth power saving mode, and total bandwidth of channels in the second channel set is less than the bandwidth of the available channels of the access point; and a responding unit 750, configured to send a request response to the first station, where the request response carries a third channel set, and total bandwidth of channels in the third channel set is less than the bandwidth of the available channels of the access point.

The signaling sending unit is configured for the access point to proactively control a station to enable the bandwidth power saving mode, and the receiving unit and the responding unit are configured to cooperate with the station when the station proactively triggers enabling of the bandwidth power saving mode.

Optionally, the access point provided in this embodiment may further include: an update instruction sending unit 760, configured to send an update instruction to a station in the bandwidth power saving mode, where the update instruction is used to indicate an updated channel set allocated by the access point to the station in the bandwidth power saving mode, total bandwidth of channels in the updated channel set is less than the bandwidth of the available channels of the access point, and the updated channel set is different from a to-be-updated channel set of the station in the bandwidth power saving mode.

Optionally, to adapt to uplink data transmission, in this embodiment, the access point may further include:

a trigger frame sending unit 770, configured to: before the first data transmission unit performs data transmission with the first station by using the operating channel of the first station, send, to the first station, a first trigger frame used to indicate the operating channel of the first station; and before the second station transmission unit performs data transmission with the second station by using the operating channel of the second station, send, to the second station, a second trigger frame used to indicate the operating channel of the second station, where the first trigger frame is used to trigger the first station to start to send data at a preset sending time point, and the second trigger frame is used to trigger the second station to start to send data at a preset sending time point.

During uplink transmission, a specific implementation in which the first data transmission unit performs data transmission with the first station by using the operating channel of the first station may be: receiving, by using the operating channel of the first station, data that starts to be sent by the first station at a preset sending time point, where the preset sending time point is specified by the access point. A specific implementation in which the second data transmission unit performs data transmission with the second station may be: receiving, by using the operating channel of the second station, data that starts to be sent by the second station at a preset sending time point.

The operating channel of the first station is a subset of a channel set of the first station in the bandwidth power saving mode; when the second station enables the bandwidth power saving mode, the operating channel of the second station is a subset of a channel set of the second station in the bandwidth power saving mode; and the operating channel of the first station and the operating channel of the second station do not overlap.

During downlink transmission, a specific implementation in which the first data transmission unit performs data transmission with the first station by using the operating channel of the first station may be: sending a PPDU to the first station by using the operating channel of the first station, where the PPDU includes service data, indication signaling used to indicate a data receiving manner of the first station, a preamble used to indicate the operating channel of the first station, and control signaling used to indicate a data-sending resource of the first station. A specific implementation in which the second data transmission unit performs data transmission with the second station by using a remaining channel may be: sending a PPDU to the second station by using the operating channel of the second station, where the PPDU includes service data, indication signaling used to indicate a data receiving manner of the second station, and a preamble used to indicate the operating channel of the second station.

The operating channel of the first station is a subset of a channel set of the first station in the bandwidth power saving mode; when the second station enables the bandwidth power saving mode, the operating channel of the second station is a subset of a channel set of the second station in the bandwidth power saving mode; and the operating channel of the first station and the operating channel of the second station do not overlap. Optionally, in this embodiment, there may be one or more second stations that perform data transmission with the access point.

When performing communication with a station in a bandwidth power saving mode, the access point provided in this embodiment of the present invention can still perform data transmission with another station by using a remaining channel. In this way, all bandwidth resources of the access point except for the operating channel of the station in the bandwidth power saving mode can also be used for data transmission, improving resource utilization of the access point.

Embodiment 5

An embodiment of this application further provides a station, including:

a bandwidth power saving mode enabling unit, configured to enable a bandwidth power saving mode.

The station enabling the bandwidth power saving mode performs data transmission with an access point by using an operating channel, where the operating channel is an available channel, in the bandwidth power saving mode, of the station, and the access point is configured to perform, by using an operating channel of a second station, data transmission with the second station when performing data transmission with the station, where the operating channel of the station and the operating channel of the second station form all or a part of available channels of the access point.

Figure 8:
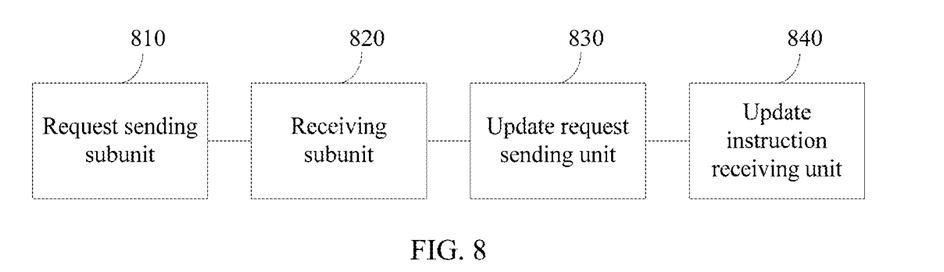
FIG. 8 is a schematic structural diagram of a station according to an embodiment of this application.

As shown in FIG. 8, the bandwidth power saving mode enabling unit may specifically include:

a request sending subunit 810, configured to send a request to the access point, where the request carries a fourth channel set, the fourth channel set is an available channel requested by the station enabling the bandwidth power saving mode from the access point, and total bandwidth of channels in the fourth channel set is less than bandwidth of the available channels of the access point; and a receiving subunit 820, configured to receive a request response sent by the access point, where the request response carries a fifth channel set, and total bandwidth of channels in the fifth channel set is less than the bandwidth of the available channels of the access point.

Alternatively, a specific implementation in which the bandwidth power saving mode enabling unit enables the bandwidth power saving mode may be: receiving second signaling sent by the access point, where the second signaling is used to instruct the station to enable the bandwidth power saving mode, and indicate a sixth channel set available to the station, and total bandwidth of channels in the sixth channel set is less than the bandwidth of the available channels of the access point.

Optionally, the station provided in this embodiment may further include:

an update request sending unit 830, configured to: after the station enables the bandwidth power saving mode, send an update request to the access point, where the update request carries a seventh channel set, total bandwidth of channels in the seventh channel set is less than the bandwidth of the available channels of the access point, and the seventh channel set is different from a to-be-updated channel set of the station in the bandwidth power saving mode; and an update instruction receiving unit 840, configured to receive a response returned by the access point for the update request, where the response is used to instruct to change the channel set of the station to the seventh channel set.

Further, the update instruction receiving unit may be further configured to: after the station enables the bandwidth power saving mode, receive an update instruction sent by the access point, where the update instruction is used to indicate an updated channel set allocated by the access point to the station, total bandwidth of channels in the updated channel set is less than the bandwidth of the available channels of the access point, and the updated channel set is different from the to-be-updated channel set of the station in the bandwidth power saving mode.

In this embodiment, when performing data transmission with a station in a bandwidth power saving mode by using an operating channel of the station, an access point performs data transmission with another station by using another operating channel. That is, in the solution of this application, the access point can perform data transmission for a station in a bandwidth power saving mode and another station at the same time. That is, for the access point, although an operating channel of the station occupies only a part of available bandwidth resources of the access point, the access point can still perform data transmission with the another station by using a remaining channel. In this way, all bandwidth resources of the access point except for the operating channel of the station can also be used for data transmission at the same time, improving resource utilization of the access point side. In addition, a channel that is used by the access point to perform data transmission with the another station is a remaining channel different from the operating channel that is used by the access point to perform data transmission with the station. Therefore, even if the operating channel of the station includes a primary channel, the access point can still perform data transmission with the another station by using the remaining channel.

If the functions of the method in the embodiment are implemented in the form of a software functional unit and sold or used as an independent product, the functions may be stored in a computing device-readable storage medium. Based on such an understanding, the part of the embodiments of the present invention contributing to the conventional art or some of the technical solutions may be implemented in a form of a software product. The software product is stored in a storage medium, and includes several instructions for instructing a computing device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The embodiments in this specification are all described in a progressive manner, for same or similar parts in the embodiments, reference may be made to these embodiments, and each embodiment focuses on a difference from other embodiments.

The embodiments disclosed above are described to enable a person skilled in the art to implement or use the present invention. Various modifications to the embodiments are obvious to the person skilled in the art, and general principles defined in this specification may be implemented in other embodiments without departing from the scope of the present invention. Therefore, the present invention is not intended to be limited to these embodiments illustrated in this specification, but shall be construed in the widest scope consistent with the principles and novel features disclosed in this specification.

What is claimed is:

1. An access point comprising a processor and a memory, wherein the memory stores program code, and the processor invokes the program code stored in the memory to execute the following operations:
sending signaling for indicating a first channel set available to a first station,
wherein the first channel set is used for the first station to receive and transmit data only on the first channel set, and
wherein a total bandwidth of the first channel set is less than a bandwidth of channels of the access point available to the first station; and
sending at the same time (i) a trigger frame to each of the first station and a second station for triggering the first and second stations to send data using first and second operating channels, respectively, or (ii) first and second physical layer protocol data units (PPDUs) by using the first and second operating channels, respectively,
wherein the first operating channel is among the first channel set and the second operating channel is among a second available channel set,
wherein the first and second operating channels do not overlap, and
wherein the second channel set includes the channels available to the first station that are not part of the first channel set.

2. The access point according to claim 1, wherein the second available channel set does not include a primary channel.

3. The access point according to claim 1, wherein the first operating channel comprises a primary channel for data transmissions of the access point.

4. The access point according to claim 1, wherein, before sending the signaling for indicating the first channel set available to the first station operating in a power saving mode, the processor invokes the program code stored in the memory to execute:

receiving a request for enabling the power saving mode from the first station; and sending a request response to the first station.

5. The access point according to claim 4, wherein the request for enabling the power saving mode from the first station carries the first channel set.

6. A first station comprising a processor and a memory, wherein the memory stores program code, and the processor invokes the program code stored in the memory to execute the following operations:

receiving signaling for indicating a first channel set available to the first station, wherein the first channel set is used for the first station to receive and transmit data only on the first channel set, and wherein a total bandwidth of the first channel set is less than a bandwidth of channels of an access point available to the first station; and receiving (i) a trigger frame for triggering the first station to send data using a first operating channel, or (ii) a first physical layer protocol data unit (PPDU) by using the first operating channel, wherein the same trigger frame also triggers a second station to send data using a second operating channel, or a second PPDU is received at the same time as the first PPDU, by the second station, by using the second operating channel, wherein the first operating channel is among the first channel set and the second operating channel is among a second available channel set, wherein the first and second operating channels do not overlap, and wherein the second channel set includes the channels available to the first station that are not part of the first channel set.

7. The first station according to claim 6, wherein the second available channel set does not include a primary channel.

8. The first station according to claim 6, wherein the first operating channel comprises a primary channel for data transmissions of the access point.

9. The first station according to claim 6, wherein, before receiving the signaling for indicating the first channel set available to the first station operating in a power saving mode, the processor invokes the program code stored in the memory to execute:

sending a request to the access point; and receiving a request response and a second signaling that are sent by the access point, wherein the second signaling instructs the first station to enable the power saving mode.

10. The first station according to claim 9, wherein the request sent by the first station carries the first channel set.

11. A non-transitory, computer readable medium storing a program code that, when executed by a computer, executes instructions that provide the following operations:

receiving signaling for indicating a first channel set available to a first station, wherein the first channel set is used for the first station to receive and transmit data only on the first channel set, and wherein a total bandwidth of the first channel set is less than a bandwidth of channels of an access point available to the first station; and receiving (i) a trigger frame for triggering the first station to send data using a first operating channel, or (ii) a first physical layer protocol data unit (PPDU) by using the first operating channel, wherein the same trigger frame also triggers a second station to send data using a second operating channel, or a second PPDU is received at the same time as the first PPDU, by the second station, by using the second operating channel, wherein the first operating channel is among the first channel set and the second operating channel is among a second available channel set, wherein the first and second operating channels do not overlap, and wherein the second channel set includes the channels available to the first station that are not part of the first channel set.

12. The non-transitory, computer readable medium according to claim 11, wherein the second available channel set does not include a primary channel.

13. The non-transitory, computer readable medium according to claim 11, wherein the first operating channel comprises a primary channel for data transmissions of the access point.

* * * * *